United States Patent [19]
Martinez

[11] Patent Number: 5,546,521
[45] Date of Patent: Aug. 13, 1996

[54] DYNAMIC PRESENTATION OF CONTEXTUAL HELP AND STATUS INFORMATION

[75] Inventor: Anthony E. Martinez, Ramsey, N.J.

[73] Assignee: International Business Machines Corporation, Armonk, N.Y.

[21] Appl. No.: 324,294

[22] Filed: Oct. 17, 1994

Related U.S. Application Data

[63] Continuation of Ser. No. 776,958, Oct. 15, 1991, abandoned.

[51] Int. Cl.$^6$ .............................. G06F 3/14; G06F 17/30
[52] U.S. Cl. ........................ 395/155; 395/157; 395/159
[58] Field of Search .................................. 395/155, 157, 395/159, 158, 156, 135; 345/119, 120, 115, 113

[56] References Cited

U.S. PATENT DOCUMENTS

| | | | |
|---|---|---|---|
| 4,556,954 | 12/1985 | Advani et al. | 364/419 |
| 4,586,035 | 4/1986 | Baker et al. | 340/712 |
| 4,648,062 | 3/1987 | Johnsen et al. | 395/155 |
| 4,789,962 | 12/1988 | Berry et al. | 395/156 |
| 4,899,276 | 2/1990 | Stadler | 340/721 |
| 4,964,077 | 10/1990 | Eisen et al. | 395/275 |
| 4,970,678 | 11/1990 | Sladowski et al. | 395/275 |
| 4,992,972 | 2/1991 | Brooks et al. | 395/155 |
| 5,029,113 | 7/1991 | Miyoshi et al. | 395/161 |
| 5,122,972 | 6/1992 | Richards et al. | 395/157 |
| 5,123,086 | 6/1992 | Tanaka et al. | 395/155 |
| 5,155,806 | 10/1992 | Hoeber et al. | 395/157 |
| 5,157,768 | 10/1992 | Hoeber | 395/157 |
| 5,175,812 | 12/1992 | Krieger | 395/156 |
| 5,283,560 | 2/1994 | Bartlett | 345/113 |
| 5,287,448 | 2/1994 | Nicol et al. | 395/159 |
| 5,388,251 | 2/1995 | Makino et al. | 395/155 X |
| 5,483,632 | 1/1996 | Kuwamoto et al. | 395/156 |

FOREIGN PATENT DOCUMENTS

| | | |
|---|---|---|
| 63-118920 | 5/1988 | Japan . |
| 0119411 | 1/1989 | Japan . |

*Primary Examiner*—Raymond J. Bayerl
*Attorney, Agent, or Firm*—Andrew J. Dillon

[57] ABSTRACT

A method and apparatus of displaying contextual help or status information to the user of a computer system in a graphical user interface. When a help facility is enabled, the system determines the position of a pointer, such as a mouse pointer, relative to the objects in the graphical user interface. If the pointer is over an object, the system refers to one or more tables which correlate objects with help and/or status information. The information is then displayed proximate to the pointer, preferably in a semitransparent window at a predictable offset from the pointer to allow the information presented by the graphical user interface to be viewed. As the pointer is moved across the graphical user interface, the information text associated with the pointer changes dynamically. In one preferred embodiment, at least one of the tables which correlate objects with the information is updated to reflect details about objects which change dynamically.

8 Claims, 9 Drawing Sheets

---

HELP LAYOUT

| APPLICATION NAME, OBJECT NAME, OBJECT TYPE, HELP STRING |

WILDCARDED HELP LAYOUT

| *, *, SCROLL BAR, CLICK ON BAR TO SCROLL TEXT FIELD |

STATIC HELP TABLE

| OVERSEE, *, MINIMIZE, CLICK TO MINIMIZE WINDOW |
| OVERSEE, *, SYS BOX, DOUBLE-CLICK TO CLOSE DIALOG BOX |
| . . . . . |
| . . . . |

DYNAMIC HELP TABLE

| OVERSEE, SYSTEM UP, SERVER ICON, SERVER IS UP AND RUNNING |
| . . . . |
| . . . . |

DYNAMIC PRESENTATION OF CONTEXTUAL HELP AND STATUS INFORMATION

This is a continuation of application Ser. No. 07/776,958, filed 15 Oct. 1991, now abandoned.

BACKGROUND OF THE INVENTION

This invention relates generally to help facilities on a data processing system. More particularly, it relates to a method of providing contextual help or status information as the user moves a pointer across a screen.

As computer technology has progressed, particularly with the advent of the personal computer, data processing has reached every level of society and every level of user. Most of the software used with personal computers is highly interactive in that the actions taken by the system are dependent upon the actions taken by the operator of the computer system. Examples of such application programs are various text processing programs and spread sheets. The commercial acceptability of any application program is largely dependent on how "user friendly" that program appears to the user. There are a variety of means of helping the user interact with a program, but one of the more important means is some sort of help facility which the user can call upon for assistance.

In the prior art, help information is usually provided in a window on the same screen from which the help is requested. The information in these windows is usually hard coded into the application itself. This type of help facility is basically a condensed version of the operating guide for the application software. This type of help facility is used in a manner similar to the operating guide, except that it is automated. The user may be forced to navigate through one or more panels in text lists in pursuit of an answer to his problem. More information is generally provided than is required.

An improvement in summoning help is "contextual help" which is dependent on the context of the help request. Several types are known in the art. The least context driven is called application contextual; "help" is a selectable action on a menu bar to be chosen by the user if he requires help with a particular application.

Panel contextual help is more context driven than application contextual. Help request areas are present in each panel to summon help information related to the particular panel. Sometimes the displayed help information will carry a heading referring to the panel which helps correlate the help information and the panel last used by the user.

The most selective means of providing contextual help is to provide help based on the current cursor position in the window in the active application. This method is called cursor focus contextual. However, when help is displayed in conjunction with the position of the pointer, it is generally displayed in a dedicated area far from the pointer position and is not very natural to access for the user. Further, while cursor focus contextual methods exist, the prior art fails to provide help information on those areas on the screen where cursor focus cannot be established. For example, certain system controls, graphics, read-only text, etc. in certain applications, cannot receive the cursor focus. Often, help is very badly needed in these areas.

In sophisticated computer programs, a specialized type of help information concerns the changing status of the various components of the system, either hardware or software. A graphical user interface is a particularly useful means of presenting this type of information, yet until a user becomes familiar with icons associated with the various states of the system additional help may be required. As status information continually changes, some means for dynamic updating must be provided.

Another problem with most help systems is that they force the system into a help mode in which actions on the application cannot be taken. This leads to a frustrating situation, particularly for a novice user, in which the user must repeatedly alternate between mutually exclusive help and application modes, while remembering the status of the application or help information while interacting with the system. It is somewhat ironic that the system which provides help to the user, also gets in his way.

To be most effective, help information should be displayed near the focus of the user's attention, e.g., a mouse pointer. However, the previous methods either use a dedicated area of the window, or display too much information and obscure the information being displayed by the application.

SUMMARY OF THE INVENTION

An object of the invention is to provide contextual help or status information dynamically as a pointer indicating the user's focus is passed over different objects in a graphical user interface.

It is another object of this invention for the help or status information to follow the focus of the user's attention as it moves across the graphical user interface.

It is another object of this invention to minimize the number of windows or keystrokes needed by the user to access help or status information.

It is another object of the invention to provide help or status information while allowing the user to simultaneously interact with the underlying application.

It is another object of the invention to provide help on portions of the graphical user interface for which the user focus cannot be set.

It is another object to present help and status information in a nonintrusive manner.

These and other objects are accomplished by a method of displaying contextual help or status information to the user of a computer system. First, the computer system determines whether a pointer indicating the focus of the user's attention in the graphical user interface, is located over a portion of the display, such as an object, where information might ordinarily be associated with it. Next, responsive to the determination that an object is present underneath the pointer, the computer system refers to a table which correlates objects or areas within the graphical user interface with information pertaining to such objects. If such information is found in the table, the information is displayed to the user on the main display, very close to the location of the pointer.

Thus, as the pointer is moved across the graphic user interface, the help text associated with the pointer changes dynamically. The pointer can be moved to any area on the screen and requires no explicit action from the end user, other than moving the pointer to the object or area in the graphical user interface, which the user wants to understand. The method can also be used to help locate items within the display which are not presented by the application, e.g., invisible windows or objects.

The method is non-modal, in that it does not force the data processing system into a specific help state while it is active.

Prior art help facilities, such as a help dialog box, would not allow the user to continue normal operation of the application until the help function was terminated. In the preferred embodiment, the only action taken by the user to enable the invention is to turn it on or off. The user can continue to interact with the underlying information as if the help information were not present.

Since the help information tracks the position of the pointer, the method provides an easy means to access the help information, as it is already at the focus of the user's attention. No other windows or key strokes, menus, etc. are necessary to get the help text. The method is also unintrusive as it displays the help information in a predictable location in relation to the pointer and is semitransparent so that information in the underlying application can be perceived in the area of the display allotted to the help information.

In one preferred embodiment, the help facility is structured as a separate application from the application which the user is trying to understand. The operating system keeps track of the location of the pointer and the various objects in the graphical user interface. Several applications can be running in the operating system, each depicted by its own icon or window. A table is set up in the help facility which correlates the various objects in a selected application with help or status information which the programmer wishes to display when the pointer is disposed over the object. When the help function of the underlying application is initiated, the help facility loads the appropriate table into the memory. Then, the facility queries the system for the position of the mouse pointer and for the identifier of the object underneath the pointer. If there is information associated with the object is in the loaded table, that information is displayed to the user in a location proximate to the pointer. As the help facility is a separate application, it can be added to an existing application which is not aware of the existence of the help facility. Alternatively, the underlying application can be aware of the help facility and interact with dynamic table in a shared memory space to update details about objects which change dynamically.

BRIEF DESCRIPTION OF THE DRAWINGS

These and other objects and features will become more easily understood by reference with the attached drawings and following description.

DETAILED DESCRIPTION OF THE DRAWINGS

The invention may be run on a variety of computers under a number of different operating systems. The computer could be, for example, a personal computer, a mini computer or a main frame computer. The computer may be a stand-alone system, part of a network such as a local area network or wide area network or a larger teleprocessing system. For purposes of illustration only, the invention is described below as implemented on a personal computer, such as IBM's PS/2 (™) series, although the specific choice of computer is limited only by memory and disk storage requirements. For additional information on IBM's PS/2 series of computers, the reader is referred to *Technical Reference Manual Personal System/2* (Model 50, 60 Systems), IBM Corporation, Part No. 68X2224, Order No. S68X-2224, and *Technical Reference Manual, Personal System/2* (Model 80), IBM Corporation, Part No. 68X2256, Order No. S68X-2256.

The operating system on which a preferred embodiment of the invention was implemented was IBM's OS/2 (™) with Presentation Manager (™), but it will be understood that the invention could be implemented on other and different operating systems and, more importantly, could be integrated into, and therefore be a part of, an operating system. For more information on IBM's OS/2 operating system, the reader is referred to *IBM Operating System/2, Version 1.2, Standard Edition Technical Reference*, IBM Corporation.

Figure 1:
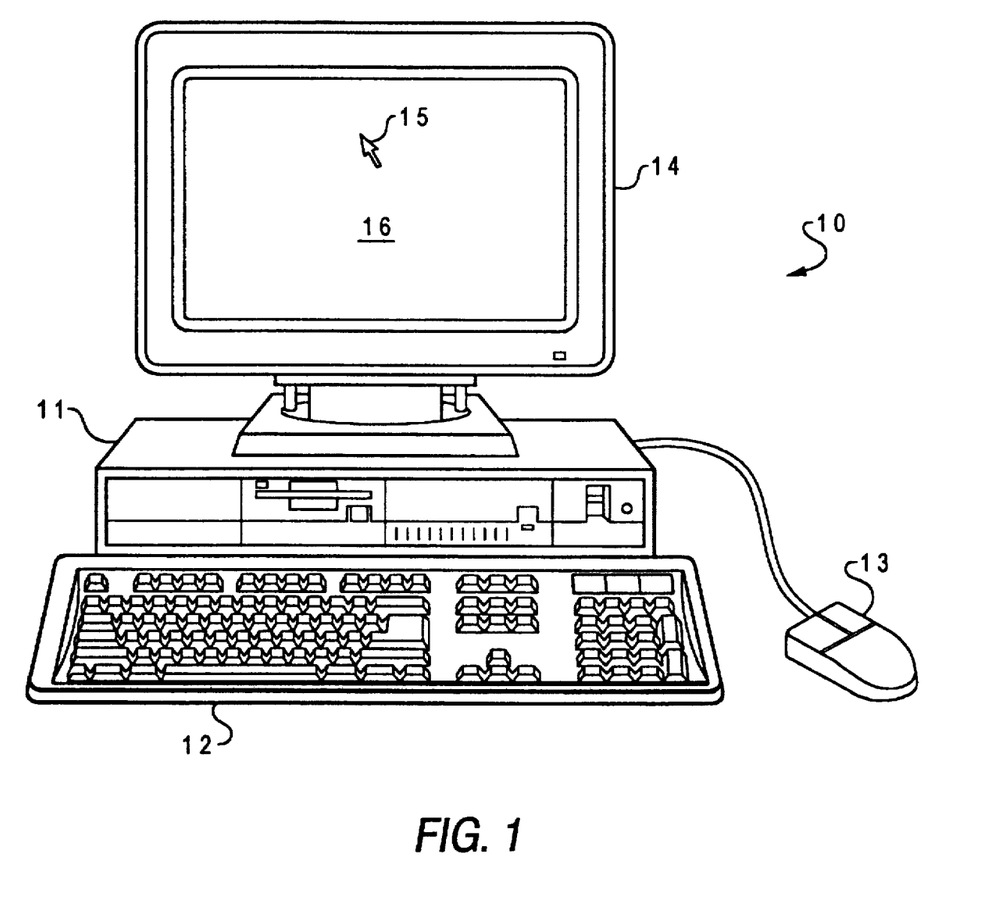
FIG. 1 is a representation of a personal computer system, including system unit, keyboard, mouse and display.

Referring now to the drawings, and more particularly to FIG. 1, which depicts a personal computer 10 comprising a system unit 11, a keyboard 12, a mouse 13 and a graphics display device or monitor 14. The keyboard 12 and the mouse 13 constitute user input devices, and the display device 14 is a user output device. The mouse 13 is used to control a cursor 15 displayed on the screen 16 of the display device 14. The Graphic User Interface (GUI) supported by this system allows the user to "point-and-shoot" by moving the cursor 15 to an icon representing an object or specific location on the screen 16 and then press one of the mouse buttons to perform a user command or selection.

Figure 2:
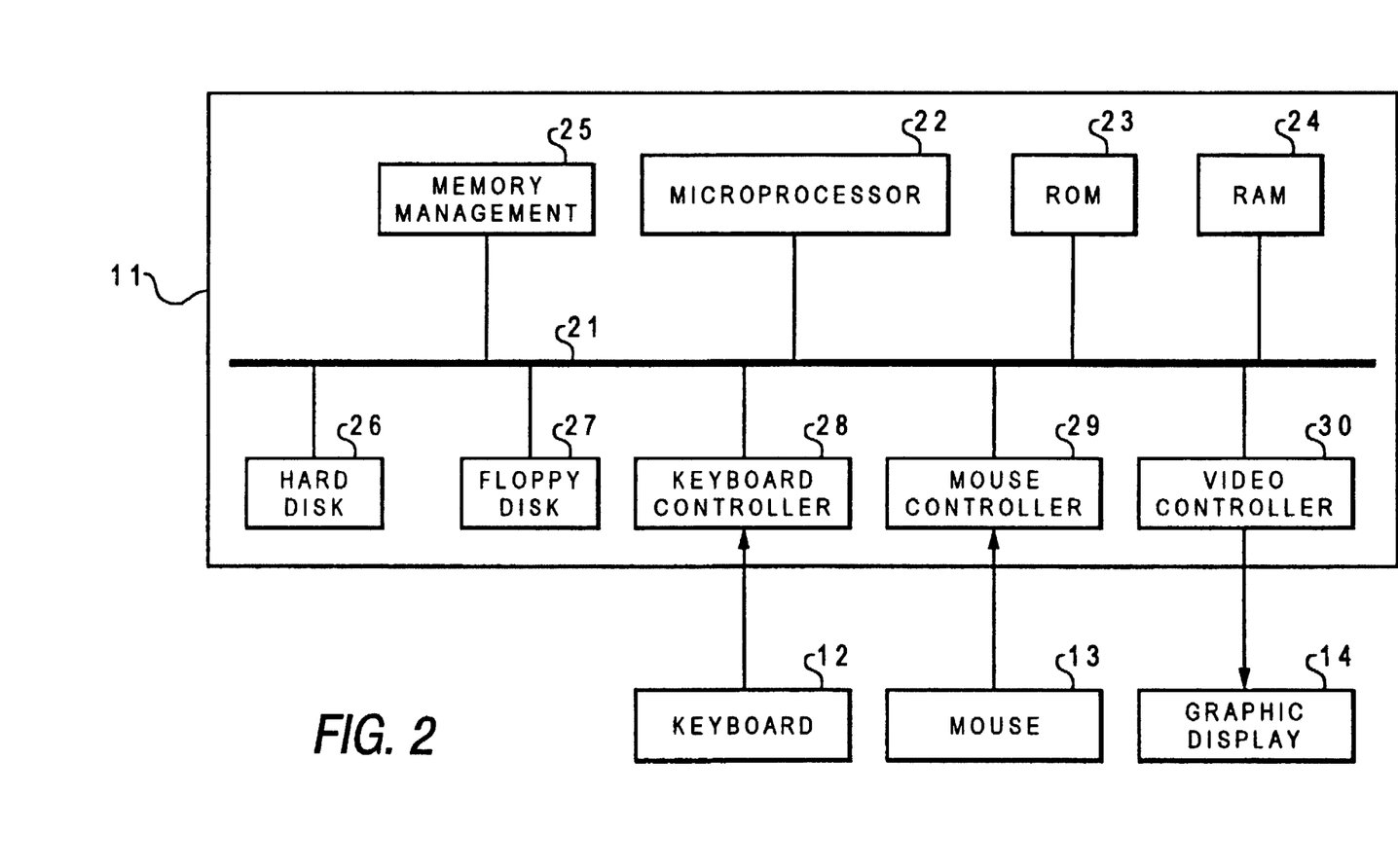
FIG. 2 is a block diagram of the computer system components in a typical personal computer system.

FIG. 2 shows in block diagram form the components of the personal computer shown in FIG. 1. The system unit 11 includes a system bus 21 to which the various components are attached and by which communication between the various components is accomplished. A microprocessor 22 is connected to the system bus 21 and is supported by Read Only Memory (ROM) 23 and Random Access Memory (RAM) 24, also connected to system bus 21. The microprocessor 22 in the IBM PS/2 series of computers is one of the Intel family of microprocessors including the 80286, 80386 or 80486 microprocessors, but other microprocessors including, but not limited to, Motorola's family of microprocessors such as the 68000, 68020 or 68030 microprocessors and various RISC (Reduced Instruction Set Computer) microprocessors manufactured by IBM, Hewlett Packard, Sun Microsystems, Intel, Motorola and others may be used in a specific computer.

The ROM 23 contains, among other code, the Basic Input/Output System (BIOS) which controls basic hardware operations, such as interactions of the disk drives and the keyboard. The RAM 24 is the main memory into which the operating system and application programs are loaded. A memory management chip 25 is connected to the system bus 21 and controls Direct Memory Access (DMA) operations, including paging data between RAM 24 and a hard disk drive 26 and a floppy disk drive 27.

To complete the description of the system unit 11, there are three I/O controllers. These are the keyboard controller 28, the mouse controller 29 and the video controller 30, all of which are connected to the system bus 21. As their names imply, the keyboard controller 28 provides the hardware interface for the keyboard 12, the mouse controller 29 hardware interface for the mouse 13, and the video controller 30 provides the hardware interface for the graphic display device 14.

The hardware illustrated in FIGS. 1 and 2 is typical but may vary for a specific application; that is, there may be other peripherals, such as optical storage media, audio I/O, printers and the like. One preferred embodiment of the invention is as an enhancement to the operating system which controls or "runs" the hardware described in FIGS. 1 and 2. As mentioned, the invention may be added to an existing operating system or it may be integrated into the operating system, but it will be assumed for purposes of this disclosure that the operating system supports a GUI. Such an operating system is IBM's OS/2 with Presentation Manager (PM) on which the invention has been implemented.

Figure 3:
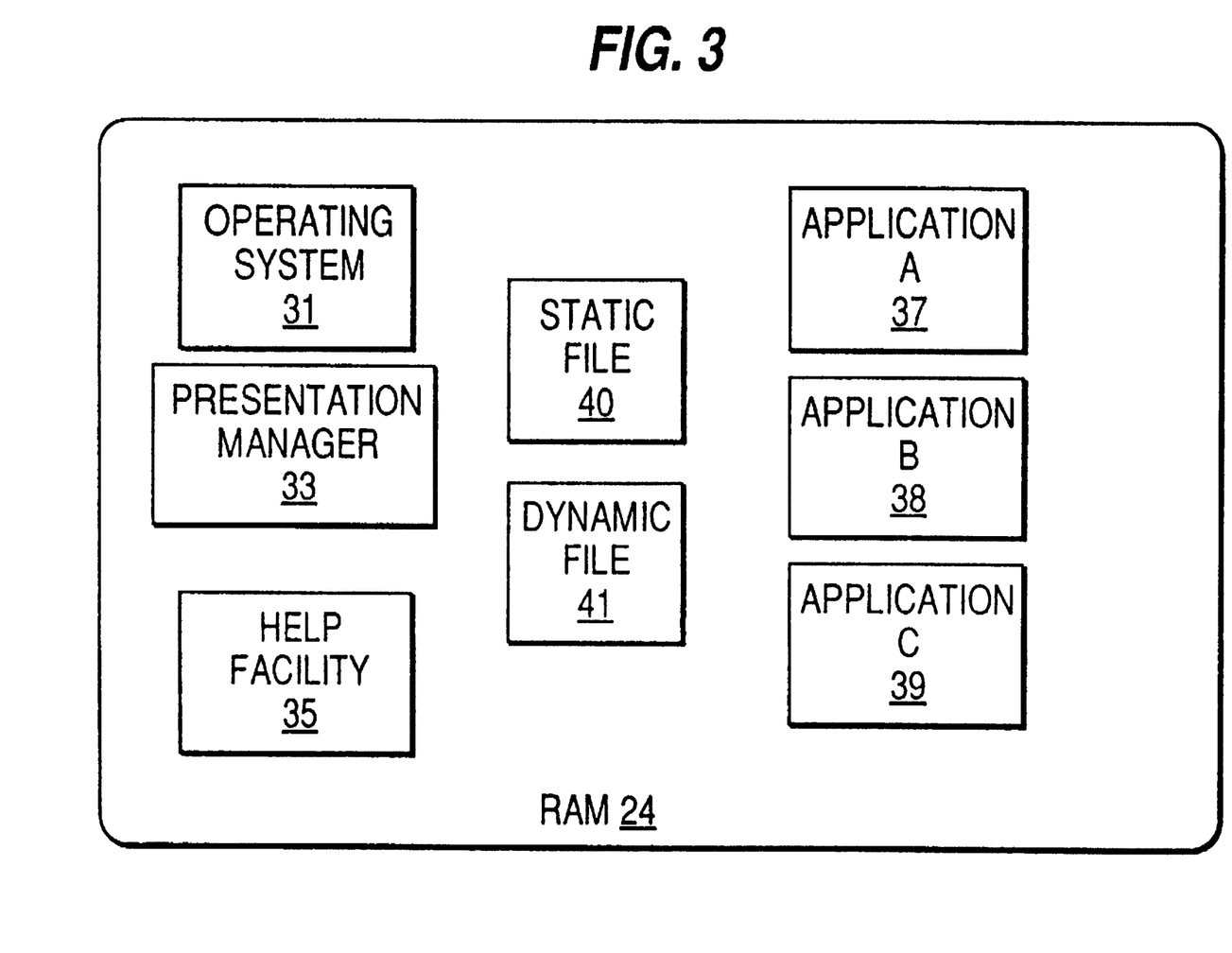
FIG. 3 depicts several applications active in the system memory, together with a help facility according to the present invention.

As shown in FIG. 3, an operating system 31 is shown resident in RAM 24 with an integrated operating environment or presentation manager 33. The operating system 31 is responsible for determining which user inputs from the keyboard 12 and the mouse 13 go to which of the applications, transmitting those inputs to the appropriate applications and performing those actions specified by the application in response to that input, e.g., displaying the result to the user on the graphic display 14. The integrated operating environment 33 can be considered part of the operating system 31 and is responsible for presenting the applications in a uniform and consistent manner within a graphical user interface. The preferred operating system 31 is IBM's OS/2 with PM. Also resident in RAM is the help facility 35 and applications A, B and C 37, 38 and 39, which represent three types of applications compatible with the preferred architecture of the help application 35. Other code modules used to control the graphic display 14 as well as interpret input from the keyboard 12 and mouse 13 would be resident in RAM 24, but are omitted for sake of clarity.

The first type of applications are aware applications represented by application number A37. Aware applications have been written with the knowledge of the capability of Infomouse 35, and therefore, have logic within them to dynamically update the shared memory in dynamic table database 41, from which Infomouse 35 can read help information. The dynamic help table 41 is on additional shared memory segment to the static help contained in database table 40 which is loaded from disk storage 26. An ideal use for an aware application would be to reveal details about objects which change dynamically, such as the number and type of mail items contained in an in-basket icon.

The second type of application, e.g. application B 38, does not contain logic to update the shared memory in dynamic help table 41. Thus, with this type of application, only static information can be displayed by Infomouse 35. Nonetheless, the information in the help database 40 can be modified to new versions of an old application to account for new releases or modifications of the application software.

The third type of application represented by application C 39 contains neither static nor dynamic help. This type of application is simply ignored by Infomouse 35. However, the help facility 35 does not interfere with operation of application C39 despite the fact that it is running on top of it. One feature of the present invention described below allows help information to be presented for generic objects associated with application C 39, despite the fact that there is no help information associated with the application.

When the help facility 35 which is called Infomouse initializes, it reads help strings from a file in disk storage 26. These strings are preferably placed in a shared memory segment so that they can be quickly accessed and are depicted as library database table 40 in RAM 24 in FIG. 3. While the description below describes the invention in terms of sensing "objects" below the pointer, it should be understood that any feature in the user interface could have information associated with it. In most advanced GUIs, almost every visible feature is associated with an object. As the objects beneath the mouse are detected, Infomouse 35 refers to this table 40. Help information is displayed to the user if it is associated with the object underneath the mouse pointer. The following description discusses the invention in connection with the mouse 13 and its pointer. Those skilled in the art would recognize that other pointing devices such as a touch sensor, graphic tablet, trackball or joystick as well as the cursor control keys on the keyboard 12 can be used to move a pointer across the display screen.

Figure 4:
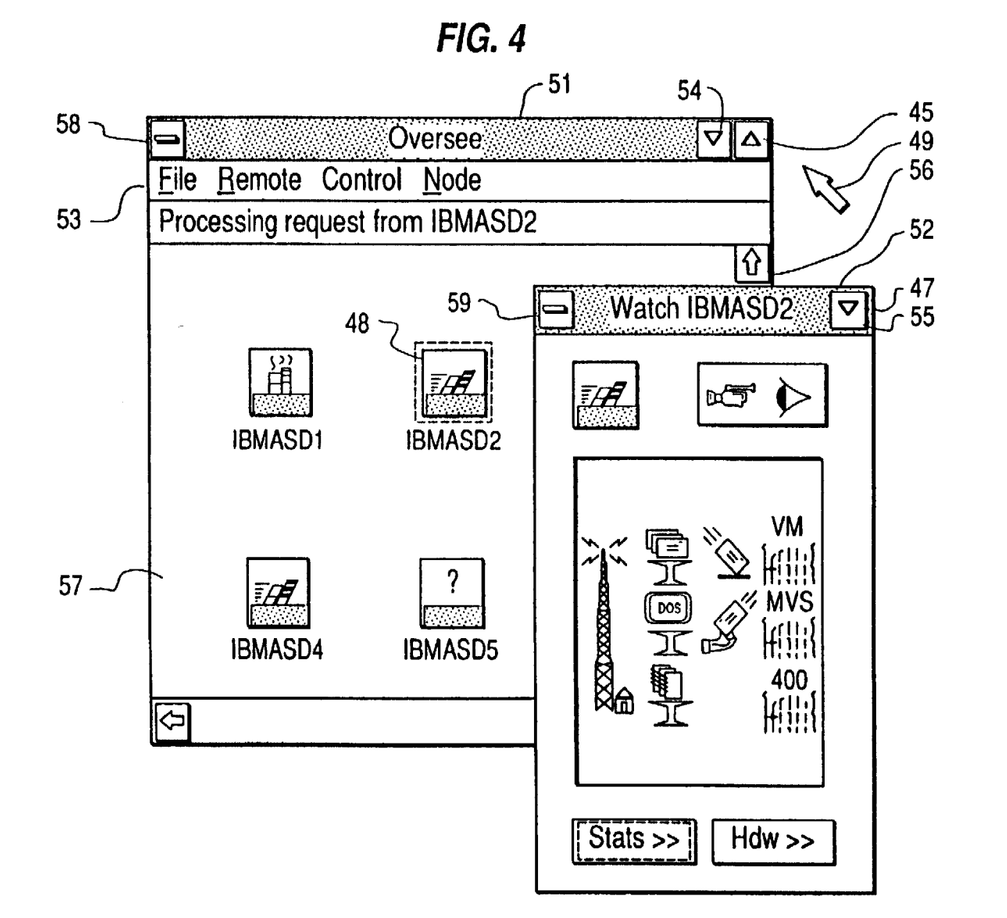
FIG. 4 is a representation of a display containing a running application window with an associated dialog box and a mouse pointer prior to the pointer being disposed over an object associated with help information.

FIG. 4 depicts an aware application called Oversee, which corresponds to application A 37 in FIG. 3, displayed in its window 45. Oversee 37 is an application which works to control a set of personal computers, such as several of PS/2s, in a Local Area Network (LAN) environment. Oversee 37 provides a means to assess of the status of each PS/2 server in the LAN. Functions such as monitoring and controlling the PS/2 server from a central PS/2 server, are included. A dialog box 47 labelled "Watch:IBMASD2" was opened due to the selection of the IBMASD2 icon 48 which provides information on the status of that server. Also depicted is mouse pointer 49. In FIG. 4, the mouse pointer 49 is over an empty area of the screen, and therefore, not over an object, thus no help information is displayed. As Oversee 37 is a PM application, it conforms to the Common User Access (CUA) guidelines for its graphical user interface. Thus, in window 45 and dialog box 47, standard items such as title bars 51, 52, action bar 53 which allows the user to choose among several actions, icons 54, 55 for maximizing or minimizing the windows 45, 47, scroll bar 56 for presenting more information in client area 57 and icons 58, 59 to close the windows 45, 47 as well other features are depicted in the Figure. In graphical user interfaces, data in the system is generally divided into objects with assigned behaviors and properties. In the CUA graphical user interface, icons or pictorial representations are used to represent the objects in the system. While the objects could be designated by text strings, human factor studies have shown that user relate better to pictorial representations.

Figure 5:
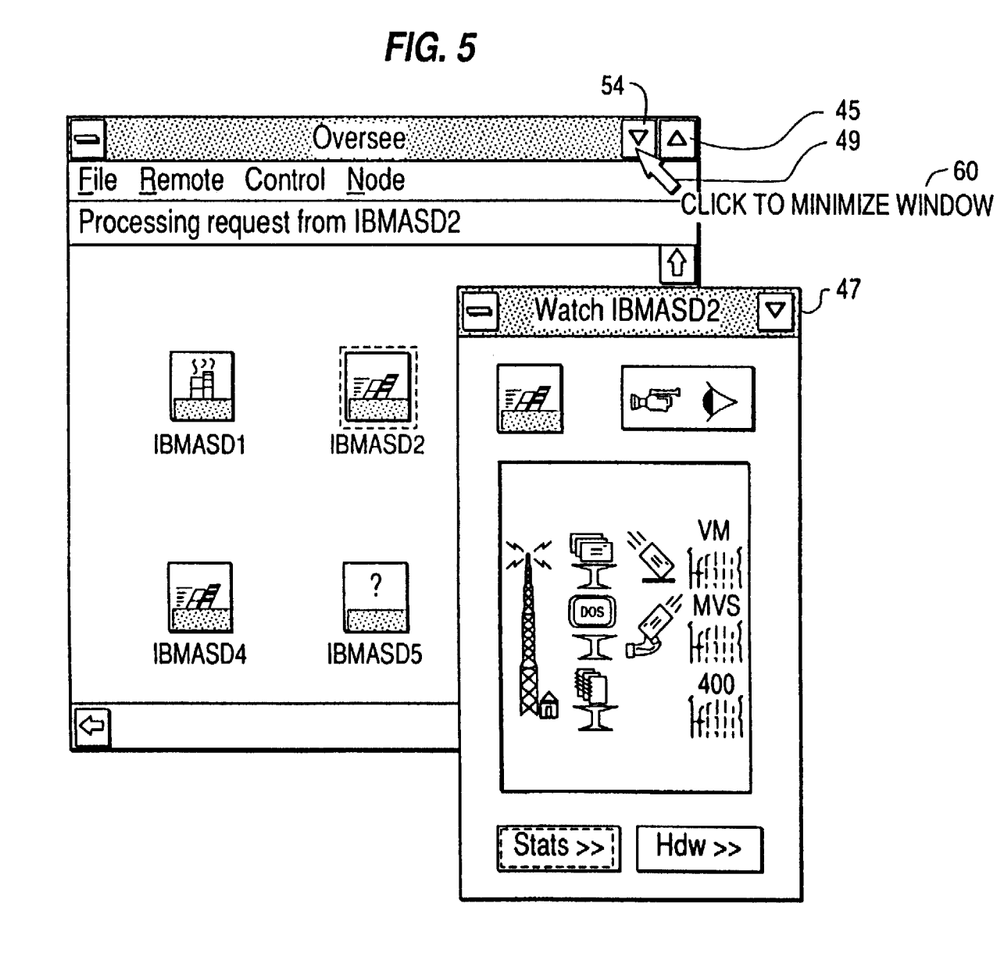
FIG. 5 is a representation of a display in FIG. 4 where the mouse pointer has moved to the minimize window icon and help information is displayed.

In FIG. 5, the mouse pointer 49 has been moved over the minimize window object icon 54, which is an object of which OS/2 and Presentation Manager 31 keep track in the graphical user interface. The Infomouse application 35 queries the operating system 31, whether the mouse pointer 49 has moved, whether the. mouse pointer 49 is over an object, and for the identity of that object. In response to finding that the mouse pointer 49 is over an object 54, Infomouse 35 first looks into dynamic table 41 for help information associated with minimize window object 54. Finding none, Infomouse 35 looks into the static table database 40, to determine whether a help string should be displayed to the user. In this case, a help string is found, "click to minimize window" and is displayed to the user in information window 60 which is located proximate to the mouse pointer 49.

Infomouse 35 keeps the help information field 60 proximate to the mouse pointer 49 by taking the mouse pointer location information from the operating system 31 and offsetting the help information window 60 a predetermined distance from the pointer. Other than the help information itself, in the preferred embodiment, the information field 60 is transparent, allowing the underlying application to be presented to the user. This is in contrast to the presentation of the dialog box 47 which is over main window 45. This mode of help information presentation is done for several reasons. First, the information is presented near and in a predictable position with respect to the mouse pointer 49. This avoids having the user split his attention between two places and provides the information at the focus of his attention. Yet, because the information is presented at a fixed position relative to the mouse pointer 49, it is unintrusive. The user can tune the information out if not needed at the particular moment, allowing him to act on the underlying application. The semitransparent help information field 60 allows a maximum of application information to be perceived. An alternative design would have an opaque information field which would pop up at random locations near the pointer, but at least from the user's perspective, this would be much more intrusive.

Figure 6:
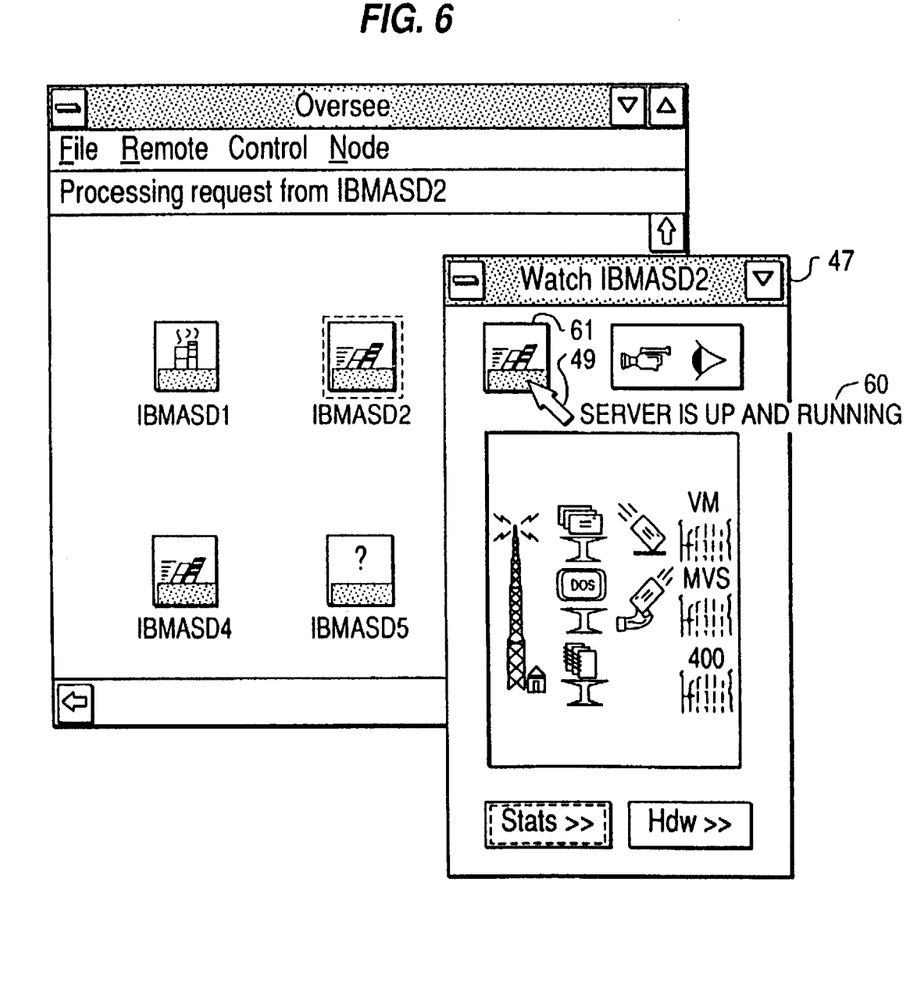
FIG. 6 shows the display in FIG. 4, where the mouse pointer has been moved to a server icon and help information is displayed.

In FIG. 6, the mouse pointer 49 has been moved over the server icon 61 in the "Watch:IBMASD2" dialog box 47. In response to the new position, Infomouse 35 executes a similar process to that shown in FIG. 5. Infomouse 35 queries the operating system 31 for the current mouse pointer position, whether the mouse pointer 49 is over an object, and if so, what its identity is, and then refers to a help table to determine if a message should be displayed in the help information window 53. However, the operation differs slightly in FIG. 6, as Infomouse 35 refers to the dynamic help information table 41 to find the message that the "server is up and running". No reference to the static help table 40 is necessary. As Oversee 37 is an aware application, it updates the help message to be displayed over the server icon 61 depending on the status of the object. The message "server is up and running" is an example of status information.

Both the help and status information displayed in FIGS. 5 and 6 are examples of icons on which a cursor focus could not be established, and therefore, ones in which the prior art help mechanisms could not provide contextual help information in close association with the object in question.

Figure 7:
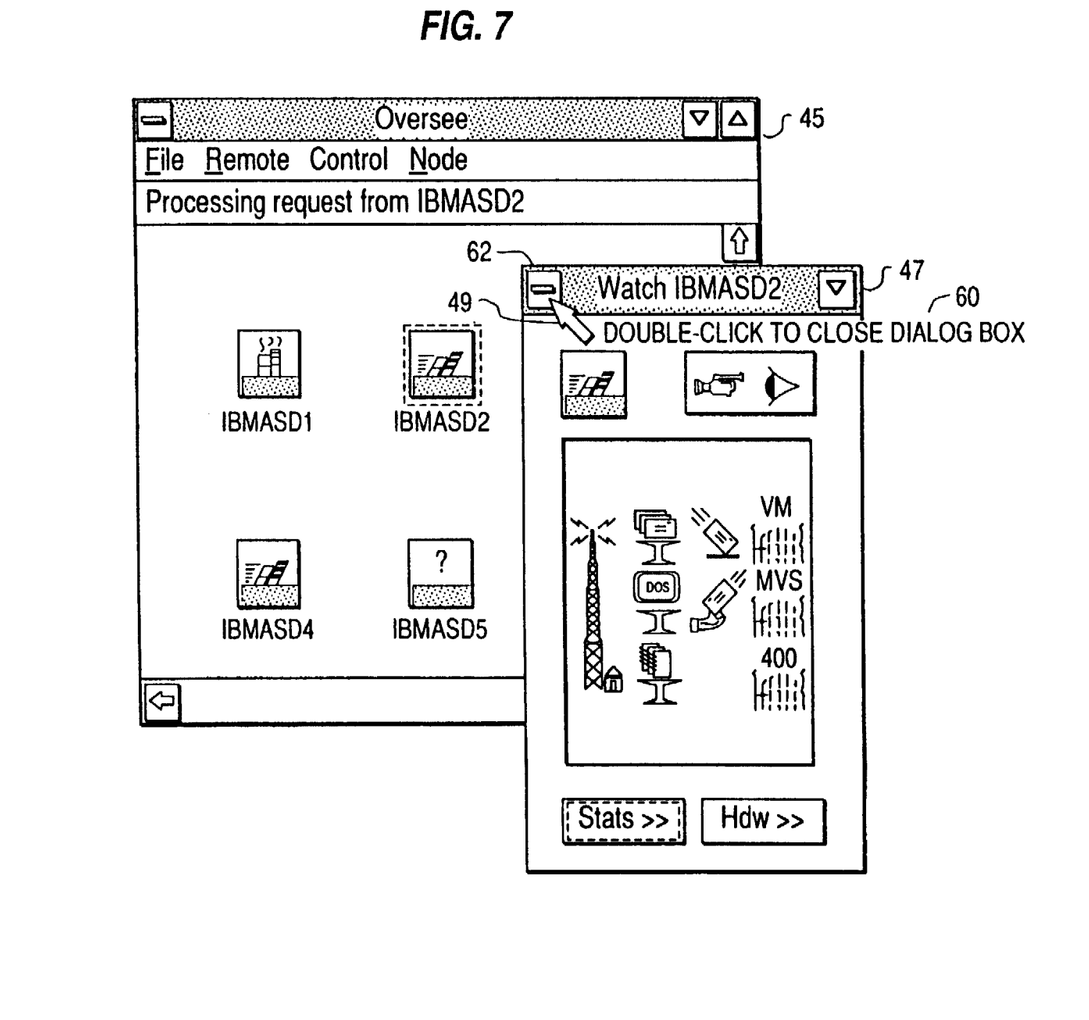
FIG. 7 depicts the display in FIG. 4, when the mouse pointer is moved to the close dialog box icon and help information is displayed.

In FIG. 7, the pointer has been moved to a window control icon 62 in the dialog box 47. Again, Infomouse 35 queries the operating system 31 for the mouse pointer position 49 and whether it is over an object in the graphical user interface. In response to the message that it is over the window control 61, Infomouse 35 first refers to the dynamic table 41, finding no help string, it then refers to the static table database 40, finds help and displays the message "double click to close the dialog box" in help information window 60. In this example, Infomouse 35 explains the purpose of the base Presentation Manager window control 61.

As depicted in FIGS. 4–7, Infomouse 35 is a non-modal help facility, in that the computer system is not forced into a specific help state which interferes with the user's interaction with the application. A modal help facility, for example, a help dialog box, would not let the user continue normal operation of the computer system until the help function had been terminated. Further, unlike prior art systems in which help must be called to appear, Infomouse 35 automatically determines whether the pointer 49 is over an object without the need for user intervention. Thus, it is simple to access; the user merely toggles it on or off at the beginning of the session. Also, Infomouse 35 is designed to display a relatively small amount of help information to avoid large numbers of keystrokes or menus. If extensive help is required, it is envisioned that a separate help facility like the automated operating guides of the prior art will be provided.

Figure 8:
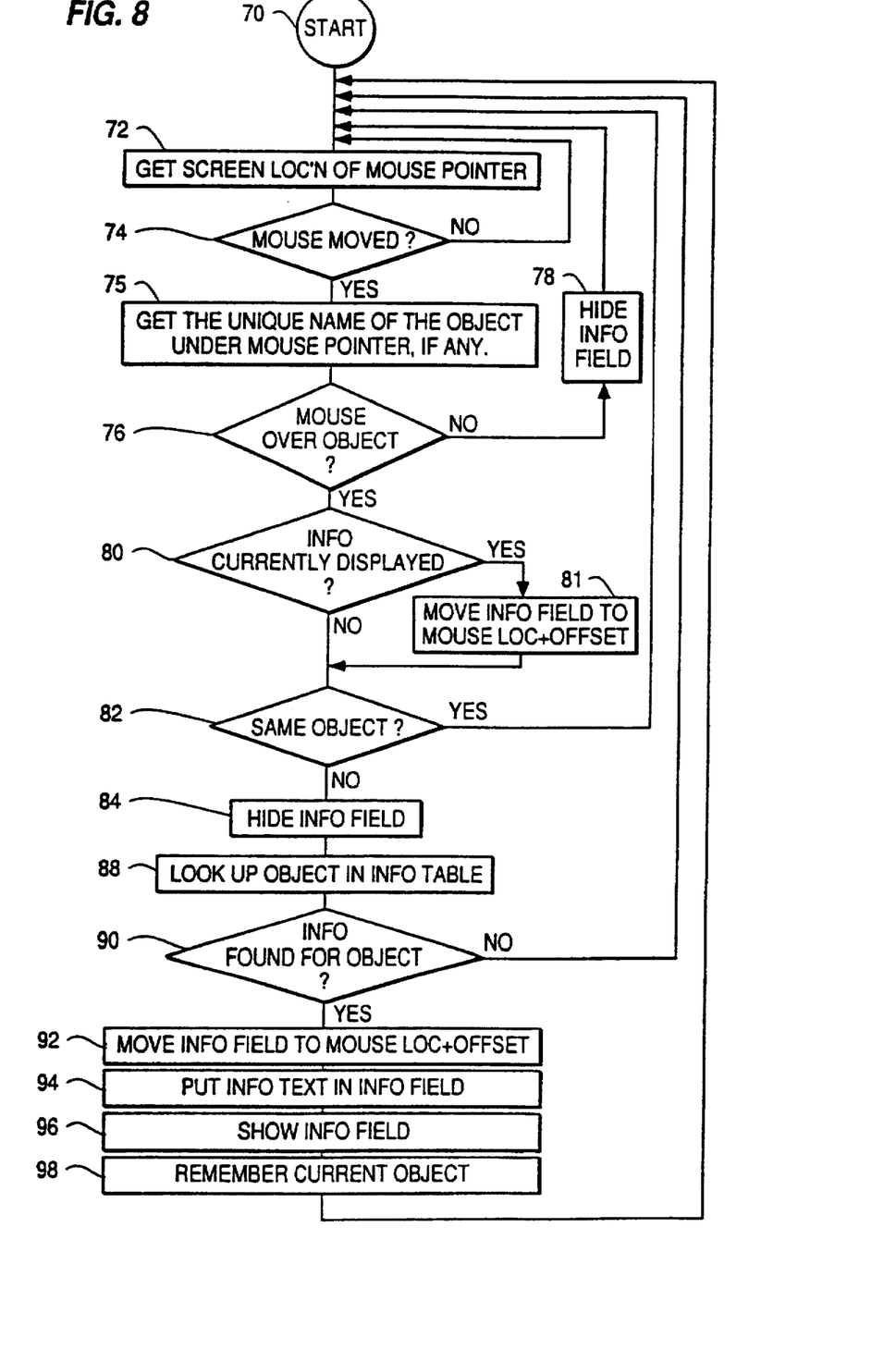
FIG. 8 is a flow diagram of a preferred embodiment of the present invention.

In FIG. 8, a flow diagram of the method of the present invention is depicted. When the user initializes Infomouse 35 in box 70, it first queries the operating system 31 for the screen location of the mouse pointer 49 in box 72. Infomouse 35 then determines whether the mouse pointer 49 has been moved from its last known position in box 74, by querying the operating system. If Infomouse 35 has just been initialized, no previous mouse pointer 49 information has been kept, so the answer is yes. If Infomouse 35 had been running for a time, the screen location of the mouse pointer 49 might be unchanged, so that it would repeat the action of getting the screen location of the mouse pointer 49 at predetermined intervals.

Next, Infomouse 35 queries the operating system 31, for the unique name of the object under the mouse pointer 49, of any. Next, it determines whether the mouse pointer 49 is over an object in step 76, if not, the help information field is hidden from the user in box 78. IT so, the help facility 35 determines whether help information is being currently displayed. If information is currently displayed, the information field 60 is moved to the new location of the mouse pointer 49 and offset 81. In the preceding examples in FIGS. 4–7, the help information field 60 is displayed at an offset from the mouse pointer location so that it appears below and to the right of the pointer 49. Infomouse 35 then determines whether it is over the same object, responding to the previously displayed information 82. If information is already being displayed about this object, Infomouse 35 does not need to look up the help information in the static or dynamic help tables 40, 41, and returns to monitoring the screen location of the mouse pointer 49 in box 72. If it is not the same object as that associated with the displayed help information, the help informantion field 60 is first hidden, box 84.

In response to the determination that the mouse pointer 49 is not over an object for which Infomouse 35 already has the help information, it finds the information associated with the object in the static and dynamic help tables 40, 41 (box 88). Next, Infomouse 35 determines whether help information was found for the object in step 90. If not, it returns to monitoring the current screen location of the mouse pointer 49. If information was found, the help information field 60 is moved to the mouse pointer location and offset in step 92, and the help information text is placed into the information field 60, step 94. The help information is then displayed to the user in step 96. Finally, the current object name is kept in memory 24 to avoid unnecessary table look-ups (box 98). The help facility 35 then returns to monitoring the current screen location of the mouse pointer 49.

Figure 9:
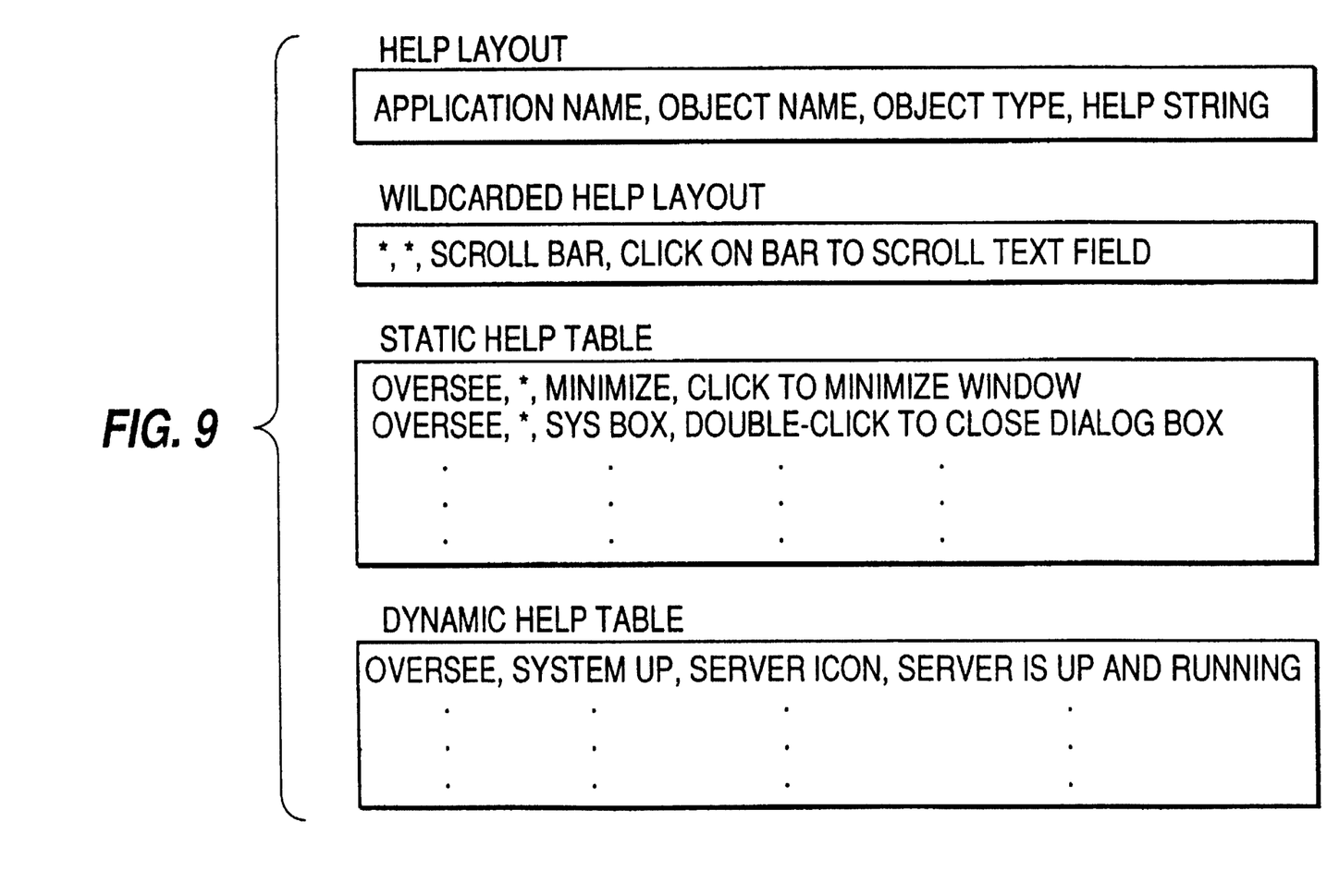
FIG. 9 is a depiction of the layout in a table which associates objects with help information.

FIG. 9 shows a sample layout suitable for the dynamic help table 41 and static help table 40. A typical entry will include the application name, the object name, the object type, and the help string associated with the other three characteristics. A wild card entry shows the ability of Infomouse 35 to provide general help for any application, as long as the object under the mouse pointer is sufficiently generic, e.g., a system control. In this layout, the application and object names are indicated by an asterisk, which means that any application or object name will do, and for object type, scroll bar is listed. Thus, for any application, so long as the mouse pointer 49 is over an object whose control type is a scroll bar, the click on bar-to-scroll next text field help string will be displayed.

A generic table full of similar help information can be included in the Infomouse application 35 in a table which is not application specific. Thus, one embodiment Infomouse 35 will refer to three tables, the dynamic and static help tables 41, 40 if they exist for the application and then a third generic help table if information is not found with the dynamic or static tables. For application C 39, Infomouse would only refer to the generic table as there are neither static or dynamic tables for the application. For improved efficiency, Infomouse 35 can determine the type of application and reduce the number of fruitless searches for nonexistent dynamic or static help tables.

Also in FIG. 9 are abbreviated static and dynamic help tables for Oversee 37 depicted in FIGS. 4–7. In FIG. 5, when the pointer was over the minimize window object icon 54, Infomouse found the help information "click to minimize window" in the first line of the static help table. In FIG. 6, when the pointer was over the server icon 61, Infomouse 35 found the status information "server is up and running" in the dynamic help table, the updated information provided to the dynamic table by Oversee. As both the minimize window object icon 54 and the window control icon 62 are fairly generic in OS/2 with PM, help could have been provided in a generic help table, rather than a static help table associated with Oversee 37.

The method of the present invention can also be implemented in a self-contained application program. In this case, the application program must keep track of the position of the icons associated with various objects. The following psuedo code illustrates some of the necessary steps within an application:

```
01  Execute when the processor IDLE"
02    if infomouse is currently being shown then
03      place the current position of the mouse pointer into variable
        M
04      get the identifier of the object that is under the mouse
        pointer
05      set the INFOMOUSE text field to status text of the object
06      move the INFOMOUSE text field to variable M + con-
        stant OFFSET
07    endif
08  end (idle process)
```

Lines 1 and 8 bracket an IDLE loop. When the program is not busy, it received the IDLE message. Putting the help facility in the idle loop enables it to operate without impeding normal program execution. Lines 2 and 7 bracket a decision: If the user wants help, he toggles it on in the application's user interface, and therefore, the block code under the decision is activated. If not, the block of code is bypassed.

Line 3 gets the current position of the mouse pointer and places it in variable M. Line 4 gets a reference to the object that is currently the mouse pointer. Line 5 obtains the status information from the object that was obtained in 4. The status information is set elsewhere in the program and contains help associated with the object in question. The status information is equivalent to the static and dynamic help tables of the earlier embodiment. That information is placed into the semi-transparent text field which follows the mouse pointer. Line 6 moves the INFOMOUSE (help) field so that is is located down an to the right of the mouse pointer as is indicated by the keep constant.

While the invention has been described with respect to particular embodiments above, it would be understood by those skilled in the art that modifications may be made without departing from the spirit and scope of the present invention. These embodiments are for purposes of example and illustration only and are not to be taken to limit the scope of the invention narrower than the scope of the appended claims.

I claim:

1. In a data processor, a method of displaying contextual help to a user thereof comprising the steps of:

initializing a help program;

automatically determining whether a pointer in a graphical user interface in the processor is located over a first data object;

responsive to determining that said first data object is present under the pointer and determining that said help program is initialized, finding information stored in the processor corresponding to the first object, wherein said finding step includes the steps of:

referring to a first table in which corresponding information correlated to the objects in the graphical user interface is dynamically updated to account for changes in the objects;

responsive to not finding corresponding information in said first table, referring to a second table in which corresponding information correlated to the objects in the graphical user interface is stored longer than in said first table;

responsive to not finding corresponding information in said second table, referring to a third table in which corresponding information correlated to the type of objects generally found in the graphical user interface is stored; and responsive solely to finding information corresponding to the first data object, displaying the information to the user proximate to the location of the pointer.

2. The method as recited in claim 1, which further comprises the steps of:

moving the pointer across the graphical user interface to a second object;

automatically determining that the pointer is located over the second object;

responsive to the determination that the second object is present under the pointer, finding information pertaining to the second object in said first table which correlates objects within the graphical user interface and information corresponding to the objects; and, responsive solely to finding information corresponding to the second object in said first table, displaying the corresponding information to the user proximate to the location of the pointer.

3. The method as recited in claim 1, which further comprises the steps of:

updating the information in the first table corresponding to the objects in the graphical user interface to account for changes in the objects;

automatically determining whether the pointer is located over a second object;

responsive to determining that the second object is present under the pointer, looking up information pertaining to the second object in the first table; and, responsive solely to finding updated information corresponding to the second object in the first table, displaying the updated information to the user proximate to the location of the pointer.

4. The method as recited in claim 1, wherein the corresponding information is displayed in a predictable location with respect to the location of the pointer so that the information is readily accessible, and the underlying graphical user interface is only covered by a textual portion of the corresponding information.

5. A data processing system which displays contextual help to a user comprising:

means for initializing a help program;

means for automatically determining whether a pointer in a graphical user interface is located over a first data object;

means for finding information stored in the data processing system corresponding to the first data object responsive to a determination that the first data object is present under the pointer and that said help program is initialized, wherein said means for finding includes:

means for referring to a first table in which corresponding information correlated to the objects in the graphical user interface is dynamically updated to account for changes in the objects;

means for referring to a second table in which corresponding information correlated to the objects in the graphical user interface is stored longer than in said first table in response to not finding corresponding information in said first table;

means for referring to a third table in which corresponding information correlated to the type of objects generally found in the graphical user interface is stored in response to not finding corresponding information in said second table; and means for displaying the information to the user proximate to the location of the pointer responsive solely to finding information corresponding to the first data object.

6. The system as recited in claim 5, which further comprises:

means for moving the pointer across the graphical user interface to a second object; and, wherein the determining, finding and displaying means are used to find and display the corresponding information to the second object to the user at a location proximate to the location of the pointer.

7. The system as recited in claim 6, wherein the corresponding information is displayed in a predictable location with respect to the location of the pointer so that the information is readily accessible, and the underlying graphical user interface is only covered by a textual portion of the corresponding information.

8. The system as recited in claim 5, which further comprises:

means for updating information pertaining to objects in the graphical user interface to account for changes in the objects; and, wherein the determining, finding and displaying means are used to display the updated information to the user proximate to the pointer.

\* \* \* \* \*